United States Patent [19]
Warncke

[11] 3,890,647
[45] June 24, 1975

[54] WINDOW SHIELD FOR RESPIRATORY MASK AND PROTECTIVE HELMUTS
[75] Inventor: Ernst Warncke, Lubeck, Germany
[73] Assignee: Dragerwerk Aktiengesellschaft, Germany
[22] Filed: Jan. 18, 1974
[21] Appl. No.: 434,435

[30] Foreign Application Priority Data
Feb. 1, 1973 Germany.......................... 2304866

[52] U.S. Cl. ................. 2/9; 15/250.3; 15/250.18; 15/250.36; 2/14 K
[51] Int. Cl.² .......................................... A61F 9/04
[58] Field of Search ............ 2/9, 8, 14 K; 15/250.3, 15/250.18, 250.36; 350/61

[56] References Cited
UNITED STATES PATENTS
3,139,644  7/1964  Smith .............................. 15/250.30
3,402,418  9/1968  Le Roy ............................. 15/250 A
3,447,187  6/1969  Barrett ............................ 350/61 X FOREIGN PATENTS OR APPLICATIONS
865,917   3/1941  France ............................. 2/14 K
316,502   8/1929  United Kingdom ............... 2/14 K
456,500   11/1925 Germany .......................... 2/14 K Primary Examiner—Werner H. Schroeder
Assistant Examiner—Peter Nerbun
Attorney, Agent, or Firm—McGlew and Tuttle

[57] ABSTRACT

A respiratory mask, particularly an oxygen mask, includes a windshield in front of the eye position of the mask having a resilient wiper body extending across the shield and connected at its respective ends to pivot members. The pivot members are rotatably supported in either the mask body or the window shield and they hold the wiper body therebetween in resilient engagement with the inner surface of the window shield. Rotation of the pivot members effects movement of the wiper body between the opposite edges of the window shield.

11 Claims, 4 Drawing Figures

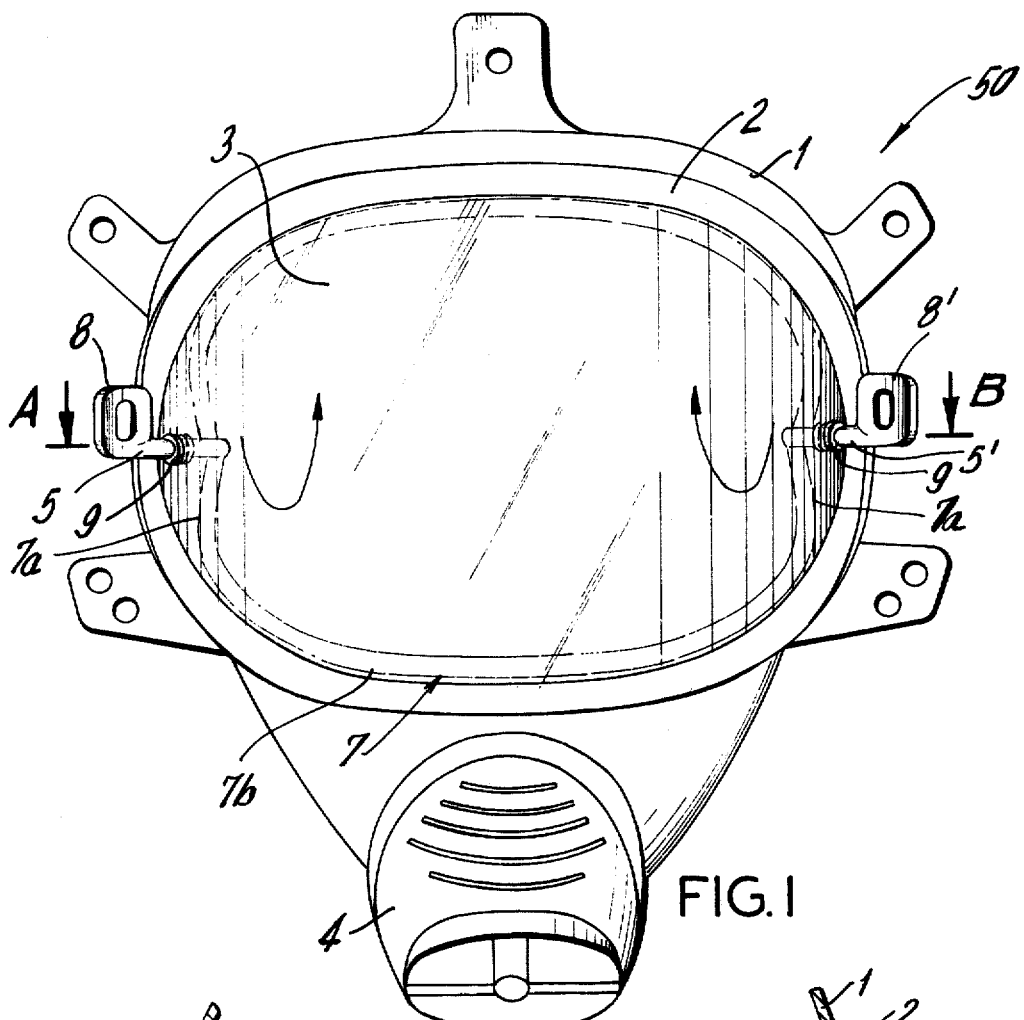
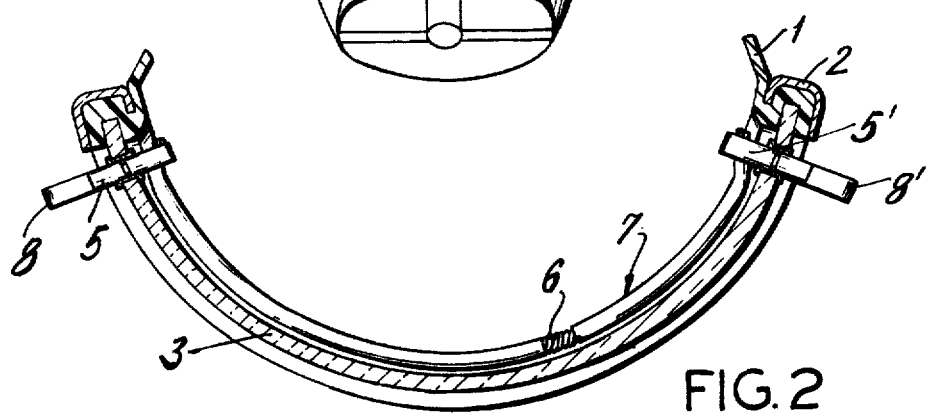
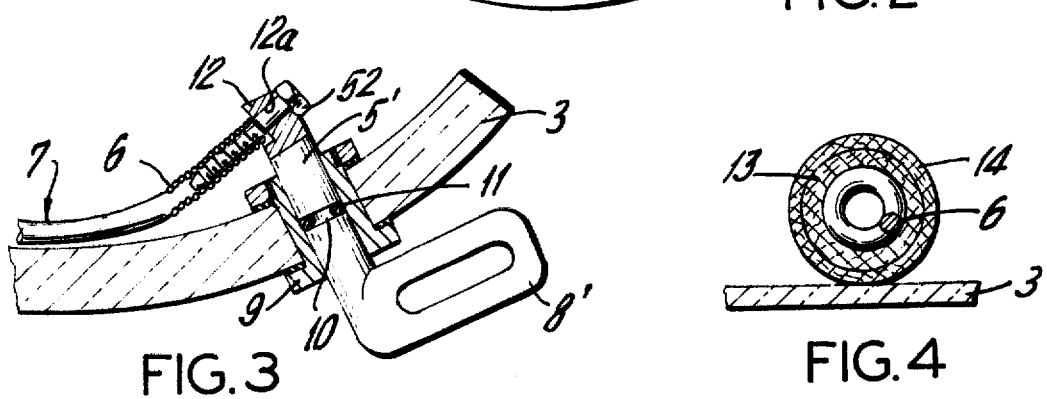

WINDOW SHIELD FOR RESPIRATORY MASK AND PROTECTIVE HELMUTS

BACKGROUND OF THE INVENTION

1. Field of the Invention

This invention relates in general to the construction of face masks and, in particular, to a new and useful face mask having a windshield wiper and to an improved windshield wiper construction therefor.

2. Description of the Prior Art

The present invention relates in particular to a face mask, such as an oxygen mask or protective helmet, which usually has a curved eyepiece or window which has a tendency to fog up or become coated with condensed moisture when it is worn by a person. Oxygen masks with a pivotal windshield wiper and a convex window pane are known, where the window pane is so curved that it forms a part of the base and of the shell of an upwardly widening truncated cone. In such a construction, the fulcrum of a wiper blade is arranged in or close to the axis of rotation of the truncated cone. The wiping surface of the window shield wiper of the cone shell surface must be correspondingly curved. The known wiper can have two juxtaposed wiping surfaces, each of which is adapted to the form of the edge piece of the window pane to which it is brought in one end position of the wiper. The two wiping surfaces can be connected at their ends to a ring-shaped wiper.

An oxygen mask having a convex window pane is known, where the window pane is curved in such a manner that it forms a part of the cone shell or of the shell and the top surface of a truncated cone having an apex or imagined apex which is in the range of the lower part of the window pane. In such a construction, a pivotal wiper is mounted on the cone axis of the window pane.

SUMMARY OF THE INVENTION

In accordance with the present invention, a window shield wiper for face masks, such as oxygen masks or helmuts, having a single pane, and wherein the wiper cover is the entire window shield surface, even in the event of a curved window, and which is simple in design and manufacture and also easy to handle and service is provided. In accordance with the invention, there is provided a wiper for a window of a mask of this character which has a pivot at each end and which is mounted in bearings which traverses through the wall of the mask. The inner ends of the pivots are spaced inwardly from the mask window and they carry an elastic wiper body therebetween which resiliently bears on the inner wall of the window shield. The bearings for the pivots may advantageously traverse the mask body instead of the window shield itself, and they may be provided with handles on the exterior to permit rotation thereof and the movement of the wiper blade, which due to its resiliency, is urged into contact with the window during its entire period of movement. The wiper is advantageously made of a resilient element, such as a continuous coil spring, extending between the two pivots, and connected into the pivots in a manner such that they extend inwardly into resilient engagement with the window. The wiper body is sized so that it extends from the associated pivot either upwardly or downwardly to the extreme end position of the window in a rest position and it is held in this position under the tension of its spring construction in the manner in which the pivots hold the wiper blade against the window. In the rest position it may for example be oriented at the bottommost end of the window in a position so that it will not hinder the field of view.

In an advantageous embodiment of the invention, the wiper body is elastic and advantageously is in the form of a coil spring, an elastic rubber member or plastic rod or the like, which is sheathed by a wiping material. It is of advantage if the support for the wiper has a configuration other than a round cross-section, for example, a triangular cross-section, etc. A coil spring or an elastic rubber or plastic rod are particularly expedient embodiments of the wiper body, since they are simple to manufacture and reliable in maintaining the bearing tension. In addition, they are relatively lightweight and easy to care for. The absorbent wiping material is capable of absorbing liquid clear vision agents. If the clear vision agent is removed by the moisture on the inner wall of the windshield, the window shield wiper is actuated several times and a new clear vision film is thus applied.

The window shield wiper, according to the invention, increases the reliability of the carrier by better visibility, both by the use of large mask windows having a simpler surface and by the possibility of keeping it clean and clear and it extends its activity range. The construction is surprisingly simple to manufacture and to handle.

Accordingly, it is an object of the invention to provide a windshield wiper for face masks, particularly for oxygen and respiratory masks or protective helmuts, which comprises an elongated resilient wiper body connected at its respective ends to two pivot members which are rotatably supported in bearings extending through the walls of the mask or the windshield and which support the wiper body so that it is biased into engagement with the window shield and moved during rotation of the pivots in engagement with the window shield.

A further object of the invention is to provide a windshield wiper for a respiratory mask and to provide a respiratory mask construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

In the Drawing:

FIG. 1 is a front view of a respiratory mask or oxygen mask constructed in accordance with the invention;

FIG. 2 is a section taken along the line A–B of FIG. 1;

FIG. 3 is an enlarged sectional view showing the construction of the pivots in their mounting; and FIG. 4 is a transverse sectional view of the wiper body arranged in position on a window shield.

GENERAL DESCRIPTION OF THE PREFERRED EMBODIMENT

Referring to the drawing in particular, the invention embodied therein, comprises a respiratory mask or oxygen mask, generally designated 50, which includes a mask body 1, having a large window shield area 3, which is adapted to be placed on the face of a wearer with the window shield 3 aligned with the eyes of the wearer. Window shield 3 is held to mask body 1 by clamp 2 which encircles the window shield. A connecting piece 4 is connected to a forward lower portion of mask body 1.

In accordance with one embodiment of the invention, the window shield 3 is itself traversed by pivot members or pivots 5 and 5' which are connected to respective ends of an elongated resilient or wiper body 7. In the embodiment shown, the wiper body includes a continously wound coil spring 6 which is surrounded by a wiping material 13 and the wiping material in turn is surrounded by an absorbent material 14 which comprises a permeable and abrasion-resistant sheath which may be for example a chamois material. The great curvature of the window shield 3 is shown in FIGS. 2 and 3. Pivot members 5 are provided on their outsides with a handle 8 or knob which extends transversely to the window shield plane and they are rotatably mounted in a bushing or bearing 9 so as to extend completely through the window shield 3. Each pivot member 5 is provided with an annular slot 10 having a sealing ring 11 therein for sealing the traverse.

In accordance with a feature of the invention, the pivots 5 hold wiper body 7 in bearing engagement with window screen 3 during the entire range of movement between the solid line position indicated in FIG. 1 to the dotted line position indicated at the upper part of window shield 3 and in both positions, which may be considered rest positions, substantially the entire windshield area is left free for the purpose of good visibility. For this purpose, pivot members 5 extend inwardly and are provided with an angled end portion or extension 12, with a bore 12a therethrough for receiving a threaded securing bolt 52 which extends into engagement with the interior of resilient coil spring portion 6 of wiper body 7. Angle portion 12 holds the wiper body so that it is inclined to window shield 3 and is tensioned against the window surface so that it will follow the curved surface during rotation of pivot members 5. In this manner, there will be a continuous bearing of wiper body 7 on the surface of window shield 3.

Alternatively, pivot members 5 can be rotatably mounted in the body of mask 1 directly next to window shield 3. The wiper body 7 is indicated as comprising a coil spring 6, but any elastic round material, for example, a rubber or plastic rod may be employed. In addition, the cross-section does not necessarily have to be round but may be triangular or of any other suitable form.

Outer sheath 14 of the wiper body may be selected of a material which is absorbent by nature so that an additional insertion of an absorbent material 13 need not be included. Wiper body 7 is provided with an end portion 7a at each end which extends substantially straight between a central bearing portion 7b which engages on the window shield surface 3. The outer sheath 14 and the wiping material 13 can be removed from coil spring 6 or an elastic rod when it is used and be cleaned if desired. The device is thus easy to care for and to replace if necessary.

In general, only one side of the wiper body will be moved upward if only one handle 8 of pivot members 5 and 5' is rotated. If this is done, the wiper body will move upwardly so that it bears on windshield 3 in an S-shaped form. During the rotation of the second handle 8', the S-shaped position is eliminated. Wiper body 7 bears then in its entire length on the opposite edge of the window shield. By making these simple movements, the entire window shield 3 is covered. Naturally, both of the wiper blade handles 8 and 8' may be moved at the same time, if desired. If the two pivots are designed with sufficient play, and the window shield 3 is not too large, one lever member 5 may be sufficient for turning wiper body 7. As soon as the pivot starts its movement, wiper body 7 will jump to its operative position due to the automatic rotation of the second pivot.

After this type of wiping movement is completed, wiper body 7 is either located in its upper or lower rest end position extending along the edge of window shield 3 so that the field of view is substantially unhindered by the window shield wiper.

While a specific embodiment of the invention has been shown and described in detail to illustrate the application of the principles of the invention, it will be understood that the invention may be embodied otherwise without departing from such principles.

What is claimed is:

1. A face mask construction, particularly an oxygen mask or similar respiratory mask or protective helmet, comprising a mask body having a large window area thereon with a curved viewing window of a transparent material having a curvature extending over substantially its whole viewing area, a pivot bushing extending through said mask adjacent each side of said window, a pivot member rotatably supported in each of said bushings and having an exterior handle end and an interior inwardly extending end, a wiper body extending between said pivot members and connected to the interior ends thereof, said wiper body being of resilient material and being held by said interior end in a position to bear resiliently against the interior surface of said window, said pivot members being rotatable to move said wiper body through a path between the opposite edges thereof.

2. A face mask construction, according to claim 1, wherein said wiper body comprises a continuous coil spring having a covering of wiper material thereover.

3. A face mask construction, according to claim 1, wherein said wiper body includes a resilient interior member of a cross-section other than a round cross-section.

4. A face mask construction, according to claim 1, wherein said wiper body includes an interior resilient member, a covering of absorbent material and an outer sheath covering said absorbent material.

5. A face mask construction, according to claim 1, wherein said bushings extend through said window shield.

6. A face mask construction, according to claim 1, wherein said bushings extend through said mask body.

7. A face mask construction, according to claim 1, wherein each of said pivot members includes an annular groove intermediate its length at the location in which it extends through said bushing and an annular resilient seal member in said groove.

8. A face mask construction, according to claim 1, wherein each of said pivot member handle portions comprise enlarged outwardly extending handles extending at right angles to the axis of said pivot member.

9. A face mask construction, according to claim 1, wherein at least one end of said wiper body is detachably connected to its associated pivot member.

10. A windshield wiper for a respiratory mask window, comprising a partially cylindrical viewing window curved over its entire area, an elongated resilient wiper body engaged on the curved surface of said window, a rotatable pivot member connected to each end of said wiper body and projecting inwardly away from the interior surface of said window, said pivot members being spaced apart by a distance less than the unstressed length of said body so as to resiliently press said body against said window between said pivot members, bearing means for rotatably supporting each said pivot member so as to extend through the mask, at least one of said pivot members having a handle portion on the exterior of said mask for access to permit rotation of said pivot member from the exterior of the mask, said wiper body being supported at each of its ends resiliently by respective ones of said pivot members at the ends of said pivots which are spaced inwardly from said window and holding said wiper body in a position biasing it into engagement with the window during rotation thereof.

11. A windshield wiper, according to claim 10, wherein said wiper body comprises an elastic support in the form of a coil spring covered by a wiping material.

\* \* \* \* \*